United States Patent
Eckert

(10) Patent No.: US 6,521,015 B1
(45) Date of Patent: *Feb. 18, 2003

(54) METHOD AND APPARATUS FOR TREATING MOLTEN ALUMINUM USING IMPROVED FILTER MEDIA

(76) Inventor: C. Edward Eckert, 260 Lynn Ann Dr., New Kensington, PA (US) 15068

( * ) Notice: Subject to any disclaimer, the term of this patent is extended or adjusted under 35 U.S.C. 154(b) by 0 days.

This patent is subject to a terminal disclaimer.

(21) Appl. No.: 09/721,844

(22) Filed: Nov. 25, 2000

Related U.S. Application Data

(63) Continuation-in-part of application No. 09/277,803, filed on Mar. 27, 1999, now Pat. No. 6,217,631, which is a continuation-in-part of application No. 08/882,921, filed on Jun. 26, 1997, now Pat. No. 5,968,223, which is a continuation-in-part of application No. 08/682,130, filed on Jul. 17, 1996, now Pat. No. 5,718,742.

(51) Int. Cl.⁷ ............................................. C22B 9/02
(52) U.S. Cl. ......................... 75/307; 75/412; 266/227
(58) Field of Search .................. 75/307, 412; 266/227

(56) References Cited

U.S. PATENT DOCUMENTS

| | | | | |
|---|---|---|---|---|
| 5,114,472 A | * | 5/1992 | Eckert et al. | 75/678 |
| 6,036,743 A | * | 3/2000 | Butcher et al. | 75/412 |
| 6,217,631 B1 | * | 4/2001 | Eckert | 75/10.1 |

* cited by examiner

Primary Examiner—Melvyn Andrews
(74) Attorney, Agent, or Firm—Andrew Alexander

(57) ABSTRACT

A method for filtering molten aluminum containing suspended particles using an improved filtration media, the method comprising the steps of providing a source of molten aluminum and providing media having a coating thereon, the coating having a softening point at molten aluminum temperatures to provide adhesive properties and bonding of suspended particles in the molten aluminum thereto. The filtration media is contacted with molten aluminum and suspended particles are adhesively bonded thereto to provide molten aluminum having suspended particles removed therefrom.

19 Claims, 11 Drawing Sheets

METHOD AND APPARATUS FOR TREATING MOLTEN ALUMINUM USING IMPROVED FILTER MEDIA

CROSS REFERENCE TO RELATED APPLICATIONS

This application is a continuation-in-part of U.S. Ser. No. 09/277,803, filed Mar. 27, 1999, now U.S. Pat. No. 6,217, 631 which is a continuation-in-part of U.S. Ser. No. 08/882, 921 filed on Jun. 26, 1997, now U.S. Pat. No. 5,968,223, issued Oct. 19, 1999, which is a continuation-in-part of U.S. Ser. No. 08/682,130, filed on Jul. 17, 1996 now U.S. Pat. No. 5,718,742, issued Feb. 17, 1998.

BACKGROUND OF THE INVENTION

This invention relates to molten metal such as molten aluminum, and more particularly, it relates to an improved method for heating molten metals such as molten aluminum to provide improved heat control.

The use of a chlorine containing reactive fluxing gas, for the purpose of removing alkali elements (i.e., Na, Ca, K, Li), is a well established practice in the treatment of molten aluminum. Under equilibrium conditions, the respective chlorides of these elements are produced as reaction products. With the exception of LiCl, all of these halide salts, as pure species, are solid at normal treatment temperatures and thus are easily separated to the melt surface as a supernate and are removed by skimming.

Alkali elements are usually present at melt concentrations less than 500 ppm. According to the law of mass action (reaction rate approximately proportional to the concentration of reacting species), non-equilibrium metastable salts such as $AlCl_3$ and $MgCl_2$ (if Mg is present) are generated. These halides are undesirable because they contribute significantly to process airborne emissions. Further, $MgCl_2$ melts at 1306° F. and is typically molten at normal melt treatment temperatures. Molten salts are highly undesirable because of the difficulty of removing to the surface for skimming. Thus, it is highly desirable to react or complex the alkali elements to produce higher melting salts which in solid form are more efficiently separated by flotation to the surface.

In the prior methods of dispersing fluxing gas, for example, in a molten aluminum body, the fluxing gas is introduced down a shaft into the body and dispersed by a rotating impeller mounted on the shaft. However, this method is not without limitations. The rotating impeller creates a vortex about the shaft that indicates that a large portion of the molten metal is swirling or circulating about the impeller shaft at a rate approaching the rotation speed of the impeller. Fluxing media added to the molten metal tends to circulate with the molten metal with only minimal dispersion. Further, the vortex has the effect of increasing the surface area of the molten body exposed to air. The increased exposure of the molten metal to air results in an increase in dross formation, subsequent entrainment of the dross and its detrimental collateral effects. When the fluxing material is a gas, the vortex creates a problem in yet another way. Fluxing gas is displaced towards the center of the vortex by body force separation with the result that other parts of the molten body are not adequately treated with fluxing gas. Thus, the effectiveness of the process is reduced because portions of the molten body do not get treated with fluxing material. In addition, fluxing gas entrained in the molten metal flow pattern tends to coalesce, resulting in larger bubbles of fluxing gas developing in the melt. The larger bubbles lower the effectiveness of the fluxing process because less molten metal gets treated.

Common methods employed to suppress vortex formation include the insertion of baffles or rods into the melt. However, baffles are undesirable because a dead volume develops behind the trailing edges of the baffle. Another method used to suppress vortex formation is to limit power input to the impeller. However, this severely limits efficiency.

These problems continue to plague the industry as indicated in U. S. Pat. No. 5,160,693, for example, which discloses that with rotating impellers a surface vortex forms, the vortex rotating about and flowing downwardly along the impeller shaft, thereby agitating surface dross and drawing impurities back into the melt. The patent also indicates that an ideal system would minimize disturbances to the surface dross to prevent recontamination of the treated melt.

Thus, there is a great need for a more effective fluxing process which suppresses ingestion of dross from the surface back into the melt by vortex formation, for example, maintains the fluxing material finely dispersed throughout the molten body, and intensifies the contact of molten metal with fluxing material for improved fluxing of the melt.

SUMMARY OF THE INVENTION

An object of this invention is to provide an improved treatment process for dispersing media in molten metal.

Another object of this invention is to provide an improved fluxing process for molten aluminum.

Yet a further object of the invention is to provide an improved fluxing process for molten aluminum using a rotating impeller wherein substantially no vortex is formed.

And yet a further object of the invention is to provide an improved process for a body of molten aluminum wherein the fluxing gas is finely dispersed throughout the body for improved contact of fluxing gas with metal.

Still, yet another object of the invention is to provide a process for providing increased shear forces in a body of molten metal for improved dispersion of treatment media, such as fluxing gases and salts, throughout the body.

And still a further object of this invention is to provide a process for fluxing molten aluminum wherein large amounts of fluxing gas can be added without entrainment or fuming above the melt.

These and other objects will become apparent from a reading of the specification and claims and an inspection of the accompanying drawings appended hereto.

In accordance with these objects there is provided a method of heating a body of molten metal passing through a treatment bay. The method comprises providing a body of molten metal in a treatment bay and providing a baffle heater in the treatment bay to contact the molten metal. The baffle heater is comprised of a member fabricated from a material substantially inert to the molten metal, the member containing at least one heating element receptacle. An electric heating element is positioned in the receptacle for heating the member, the element protected from the molten metal by the material constituting the member.

Also, there is disclosed a method for filtering molten aluminum containing suspended particles using an improved filtration media, the method comprising the steps of providing a source of molten aluminum and providing media having a coating thereon, the coating having a softening point at molten aluminum temperatures to provide adhesive properties and bonding of suspended particles in the molten aluminum thereto. The filtration media is contacted with molten aluminum and suspended particles are adhesively bonded thereto to provide molten aluminum having suspended particles removed therefrom.

DETAILED DESCRIPTION OF THE PREFERRED EMBODIMENTS

Figure 1:
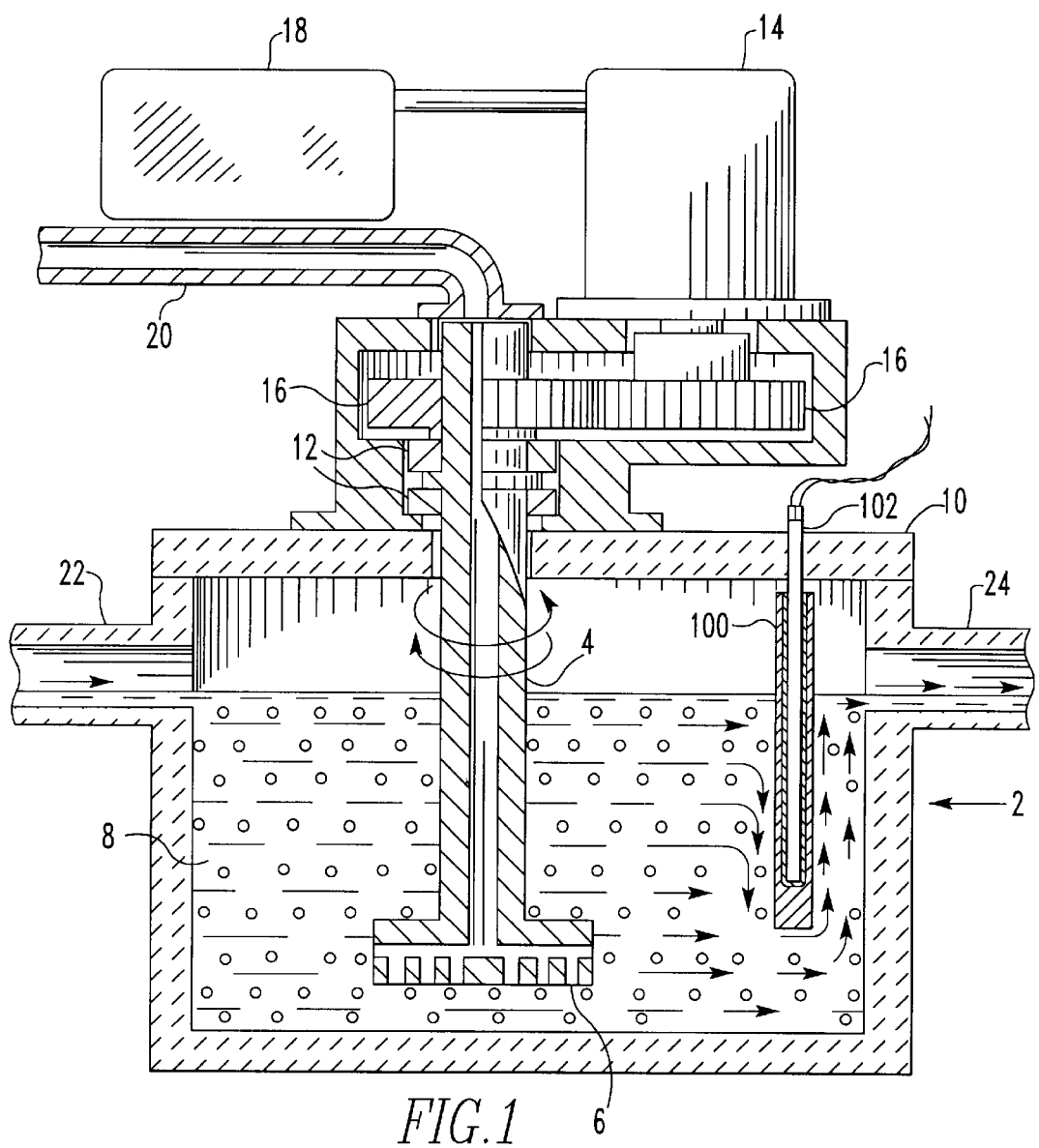
FIG. 1 is an elevational view in cross section illustrating the lack of vortex formation, molten metal flow characteristics and fluxing gas dispersion in the present invention utilizing a single impeller.

Referring more specifically to FIG. 1, there is shown a schematic of a gas fluxing bay 2 having a hollow shaft 4 and impeller or disperser 6 located in body of molten metal, e.g., aluminum, 8. Shaft 4 is carried by structure 10 and rotates on bearing 12. Further, shaft 4 is rotated by motor 14 through gears 16. Direction of rotation and revolution speed of motor 14 is controlled by control panel 18 and in accordance with the invention direction of rotation is periodically reverse for purposes of increasing shear forces minimizing vorticity as explained herein. Fluxing gas is added through tube 20 and down hollow shaft 4 before being dispersed through tubes or conduits in impeller 6 into molten aluminum 8. Instead of passing fluxing gas down hollow shaft 4, the fluxing gas may be added to the molten metal through a tube or other means. The fluxing gas may be injected adjacent impeller or disperser 6 for dispersing throughout the melt. Fluxing gases that can be used for molten aluminum in the present invention include nitrogen containing gases, carbon containing gases, e.g., fluorocarbons, halogen gases and the so-called inert gases; namely, helium, neon, argon, krypton, xenon, along with nitrogen, carbon dioxide and mixtures of these gases. In addition, chlorinaceous gases such as chlorine may be used individually or combined with the above gases. Combinations of fluxing gases that are useful in the present invention for fluxing aluminum base alloys include, for example, a combination of reactive gases such as chlorine and sulfur hexafluoride. A carrier gas such as carbon dioxide, nitrogen or an inert gas may be included with the reactive gases. When the combination of $Cl_2$ and $SF_6$ are used they may be present in the fluxing gas in a ratio that ranges from 2:1 to 10:1 parts $Cl_2$ to $SF_6$. A carrier gas may be present in this combination as long as the $Cl_2$ to $SF_6$ ratio range is maintained. The $Cl_2$ and $SF_6$ combination or other fluorine containing compounds such as fluorocarbons, e.g., hexafluorethane are useful for fluxing in accordance with the invention because the fluorine can form high melting point salts which have the capability of complexing with chloride species thereby increasing the melting point of the resulting salt mixture. Gas fluxing can be performed in batch or on a continuous basis. On a continuous basis, molten metal enters along conduit 22 and leaves by channel 24 after fluxing has taken place.

Figure 17:
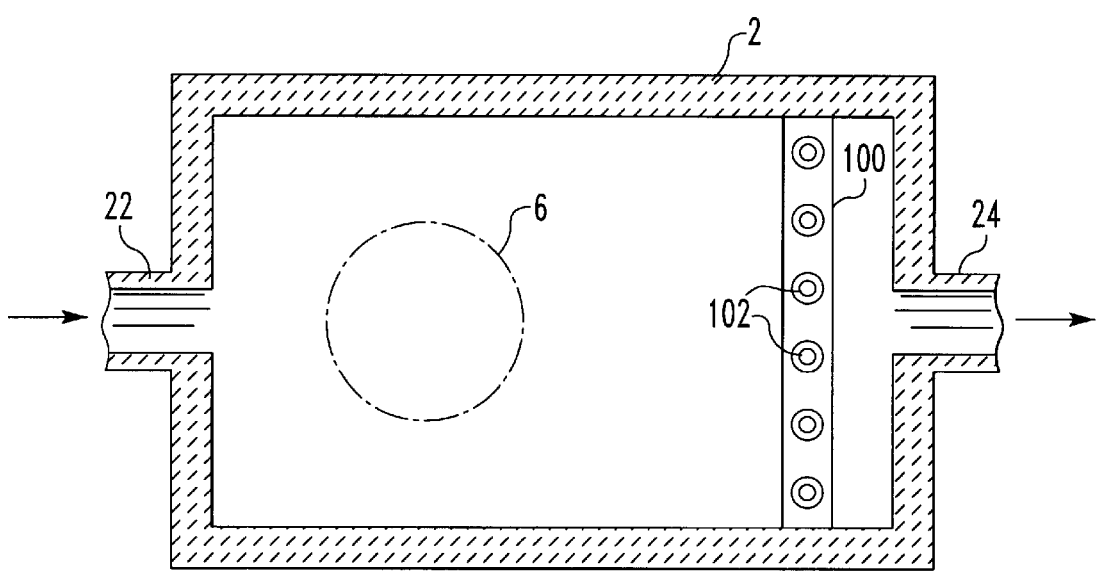
FIG. 17 is a top view of a molten metal treatment and heating bay in FIG. 1 showing a baffle heater extending between the sides of the bay.

In FIGS. 1 and 17, there is provided a baffle heater 100 which is shown extending across bay 2 to heat molten metal. That is, baffle heater 100 heats molten metal just prior to its leaving bay 2 prior to casting, for example. In the schematic shown in FIGS. 1 and 17, molten metal is shown flowing underneath baffle heater 100. Baffle heater 100 may be placed in other positions in bay 2. For example, baffle heater 100 may be placed along the sides (not shown) of bay 21 and may be spaced from the sides so as to permit heating of the molten metal by both sides of the baffle heater.

In the embodiment shown in FIG. 1, heating elements 102 are shown extending through lid 10. This permits ease of replacement for a non-functioning element.

The baffle heater may be fabricated from any material which is resistant to attack by molten metal, e.g., molten aluminum. That is, the baffle material should have high thermal conductivity, high strength, good impact resistance, low thermal expansion and oxidation resistance. Thus, the baffle can be constructed from silicon carbide, silicon nitride, magnesium oxide, spinel, carbon, graphite or a combination of these materials with or without protective coatings. The baffle material may be reinforced with fibers such as stainless steel fibers for strength. Baffle material is available from Wahl Refractories under the tradename "CAAS" or from Carborundum Corporation under the tradename "Refrax™ 20" or "Refrax™ 60", or cast from United Refractories Alu Guard-SiC or Premier Refractories Onyx 85XL.

In forming the baffle, preferably holes having smooth walls are formed therein during casting for insertion of heaters thereinto. Further, it is preferred that the heating element 102 having a snug fit with holes in the baffle for purposes of transferring heat to the baffle. That is, it is preferred to minimize the air gaps between the heating element and the baffle. Tubes or sleeves, such as stainless steel tubes or sleeves or Inconel tubes may be cast in place in the baffle material to provide for the smooth surface. Tubes or sleeves of slip cast mullite may be used. Preferably, the tube has a strength which permits it to collapse to avoid cracking the baffle material upon heating.

In another aspect of the invention, a thermocouple (not shown) may be placed in the holes in the baffle along with the heating element. This has the advantage that the thermocouple provides for control of the heating element to ensure against overheating of element 102. That is, if the thermocouple senses an increase in temperature beyond a specified set point, then the heater can be shut down or power to the heater reduced to avoid destroying the heating element.

For better heat conduction from the heater to the baffle material, a contact medium such as a low melting point, low vapor pressure metal alloy may be placed in the heating element receptacle in the baffle.

Alternatively, a powdered material may be placed in the heating element receptacle. When the contact medium is a powdered material, it can be selected from silica carbide, magnesium oxide, carbon or graphite. When a powdered material is used, the particle size should have a median particle size in the range from about 0.03 mm to about 0.3 mm or equivalent U.S. Standard sieve series. This range of particle size greatly improves the packing density of the powder and hence the heat transfer from the element to the baffle material. For example, if mono-size material is used, this results in a one-third void fraction. The range of particle size reduces the void fraction below one-third significantly and improves heat transfer. Also, packing the range of particle size tightly improves heat transfer.

Heating elements that are suitable for use in the present invention are available from Watlow AOU, Anaheim, Calif. or International Heat Exchanger, Inc., Yorba Linda, Calif.

The low melting metal alloy can comprise lead-bismuth eutectic having the characteristic low melting point, low vapor pressure and low oxidation and good heat transfer characteristics. Magnesium or bismuth may also be bused. The heater can be protected, if necessary, with a sheath of stainless steel; or a chromium plated surface can be used. After a molten metal contact medium is used, powdered carbon may be applied to the annular gap to minimize oxidation.

Any type of heating element 102 may be used. Because the baffle extends above the metal line, the heaters are protection from the molten aluminum. Further, because the baffle supplies the heat to the metal, small diameter heating elements can be used, providing for a smaller heating bay. Preferably, split-type heaters are used because they expand to provide better contact with the wall of the baffle.

The baffle heater in accordance with the invention has the advantage that both wall surfaces of the baffle heater transfer heat to the metal. Further, the baffle heater has the advantage that it applies heat to metal exiting the bay, which is traditionally the coldest area in the bay. Using a baffle heater of the invention has the advantage that no additional space is needed for heaters because they are placed in the baffle.

In the present invention, it is important to use a heater control. That is, for efficiency purposes, it is important to operate heaters at highest watt density while not exceeding the maximum allowable element temperature, as noted earlier. The thermocouple placed in holes in the baffle senses the temperature of the heater element. The thermocouple can be connected to a controller such as a cascade logic controller to integrate the heater element temperature into the control loop. Such cascade logic controllers are available from Watlow Controls, Winona, Minn., designated Series 988.

The fluxing process removes both dissolved and suspended impurities, including oxides, nitrides, carbides, and carbonates of the molten metal and alloying elements. The dissolved impurities include both dissolved gases and dissolved solids. Dissolved gases in molten aluminum, for example, include hydrogen and dissolved solid particles include alkali elements such as sodium and calcium. When chlorine gas is added, for example, it forms the chloride salt of the impurity which rises to the surface and is removed. Suspended solids are transported to the melt surface by attachment to rising gas bubbles. Hydrogen is removed by desorption into the gas bubbles and is removed. Thus, it is important to keep a fine dispersion of fluxing gas or fluxing salt distributed throughout the melt in order to provide many sites for collection and removal of both dissolved and suspended impurities.

For purposes of fluxing in accordance with the present invention, shaft 4 and impeller or disperser 6 are rotated in either clockwise or counter-clockwise direction followed by reversing direction of rotation periodically. This has the effect of substantially eliminating formation of a vortex in the body of molten metal and the problems attendant therewith. Minimizing or eliminating the vortex greatly reduces the ingestion of dross from the surface into the body of melt being treated. More importantly, periodically reversing direction of rotation of impeller 6 has the effect of considerably increasing shear force developed in the molten metal, resulting in a more uniform, fine dispersion of fluxing material throughout fluxing bay. Adding fluxing material and reversing impeller rotation direction periodically increases fluid velocity gradients in the molten metal, particularly in the radial direction. It will be appreciated that adding fluxing gas and reversing direction of rotation of impeller 6 periodically has the effect of increasing the energy of mixing applied to the body of molten metal. However, the large increase in energy of mixing is obtained with substantially no vortex and the attendant problems of dross ingestion. For example, in prior gas fluxing methods, the impeller was rotated uni-directionally and the body of molten metal would be accelerated in the direction of rotation of the impeller resulting in formation of a vortex, and only minimal energy of mixing was applied during dispersing of fluxing gas. Further, metal in the body can be used as a reaction force, opposing the rotation of the impeller, thereby maximizing the energy input. As the body is accelerated in the direction of impeller rotation, the magnitude of the reaction force is proportional to difference in relative velocity between molten metal and impeller. In the present invention, reversing direction of rotation of impeller 6 periodically greatly intensifies the energy of mixing applied during dispersing of fluxing gas. This results in molten metal flow direction being directionless or random in the body of molten aluminum and without formation of a vortex.

By shear forces are meant the forces generated by a stream of molten metal in a body moving in one direction on a stream or portion of molten metal moving in another direction, for example, an opposite direction. For instance, when an impeller is rotated, the melt flows in the same direction as the impeller at a speed less than the speed of rotation of the impeller. However, both speeds are usually not very different. The greater the difference in these two speeds the greater is the capability for dividing fluxing gas into fine bubbles by the shear force. When the direction of rotation of the impeller is reversed, a stream of metal works on or creates a shear force on an adjacent stream or portion of molten metal until the whole body reverses direction. That is, the body is moving or rotating in one direction and when the impeller is reversed, a small portion of molten metal rotates in an opposite direction, the portion increases until the whole body rotates in a generally opposite direction. It is this period of reversing or changing direction of the molten metal which induces the greatest shear forces on adjacent portion or streams of molten metal to change directions.

By inducing movement of portions of the molten metal in different directions is meant that while first portions or streams of the molten metal are moving in one direction, for example, in a circular direction, other portions or streams are forced to move in another direction, for example, generally counter to the first portions or streams. The inducing of movement may also be performed by mixing means such as impellers, electromagnetic pumps, gas nozzles or tuyeres, and streams of molten metal introduced or applied to a body of the molten metal or a combination these mixing means. Further, moving portions of the molten metal in another direction by changing directions of applying the mixing means, for example, means that the direction of the impeller may be reversed or merely stopped periodically so as to induce shear stresses into the body of molten metal by having streams or portions of the molten metal going in one direction and then having streams or portions going in other directions. Another mixing means may be applied in another direction simultaneously or alternating with the first mixing means. For example, an impeller may be used to induce movement of a portion of the molten metal in one direction and an electromagnetic pump may be used to induce movement of a second portion in another direction to provide shear forces in the body.

By fluid velocity gradient is meant the velocity profile described by the quotient of the change in radial fluid velocity, $dV_r$, and change in radial distance, $dr$. The velocity gradient is therefore, $dV_r/dr$, by Newton's law of viscosity, the magnitude of the shear force, $\tau$, is related to the velocity gradient by the flow viscosity, n, as follows:

$$\tau = -\eta dV_r/d_r$$

With respect to the length of time before reversing the direction of rotation, this can extend to 10 minutes or more with a typical time period before reversing being less than 5 minutes with a suitable period being in the range of 0.1 seconds to 3 minutes. Or, the period for reversing can vary. For example, the reversing period may start at 5 minutes and then work down to 1 minute.

The present invention has the advantage that much higher levels of fluxing gas can be introduced to the melt at each fluxing stage. By use of stage as used herein is meant a body of molten metal employing at least a single impeller or disperser operated in accordance with the invention to disperse fluxing gas therein. That is, in the use of prior uni-directional rotating impellers, the amount of fluxing gas that could be added was very limited. Typically, the amount of fluxing gas that could be added using a single uni-directional rotating impeller could not exceed 20 SCFH. If greater amounts were added fuming would be observed above the melt. Fuming above the melt is indicative of incomplete reaction of the fluxing gas with undesirable constituents in the melt. The material which constitutes the fume is the unreacted gas, for example, chlorine or aluminum chloride. Thus, it will be seen that conventional systems using uni-directional rotating impellers are very inefficient. By contrast, in the present invention, very high levels of fluxing gas can be added per stage without fuming. That is, in the present invention fluxing gas can be added at a rate in the range of 1 to 650 SCF/hour and typically 1 to 425 SCF/hour or greater without the problem of fuming, depending to some extent on the aluminum alloy and the quality of the melt being fluxed. In certain modes, the fluxing gas can be added at a rate of 5 to 250 and in other modes at a rate of 5 to 50 SCF/hour and typically 10 to 25 SCF/hour, depending to some extent on the fluxing gas and the amount of metal being fluxed. It is believed that utilization of high levels of fluxing gases in the present invention result from operation under near equilibrium conditions and from high shear forces imposed on the melt. Therefore, there is more complete formation of the desirable equilibrium phases such as NaF, $CaF_2$, KF and LiF when fluorine containing gases are used. High metal shear forces result in efficient mixing of salt phases and separation thereof to the skim layer. Thus, the fluxing process of the present invention operates with enhanced kinetics and therefore minimizes the concentration of non-equilibrium salt phases produced during fluxing. The process results in efficient mixing and separation by the flotation method. Fluorine bearing gases in the process react to form a series of high melting point salts. These salts have the capability of effectively complexing or reacting with chlorine to increase the melting point of the resulting salt mixture which can be more easily separated as a solid.

Figure 2:
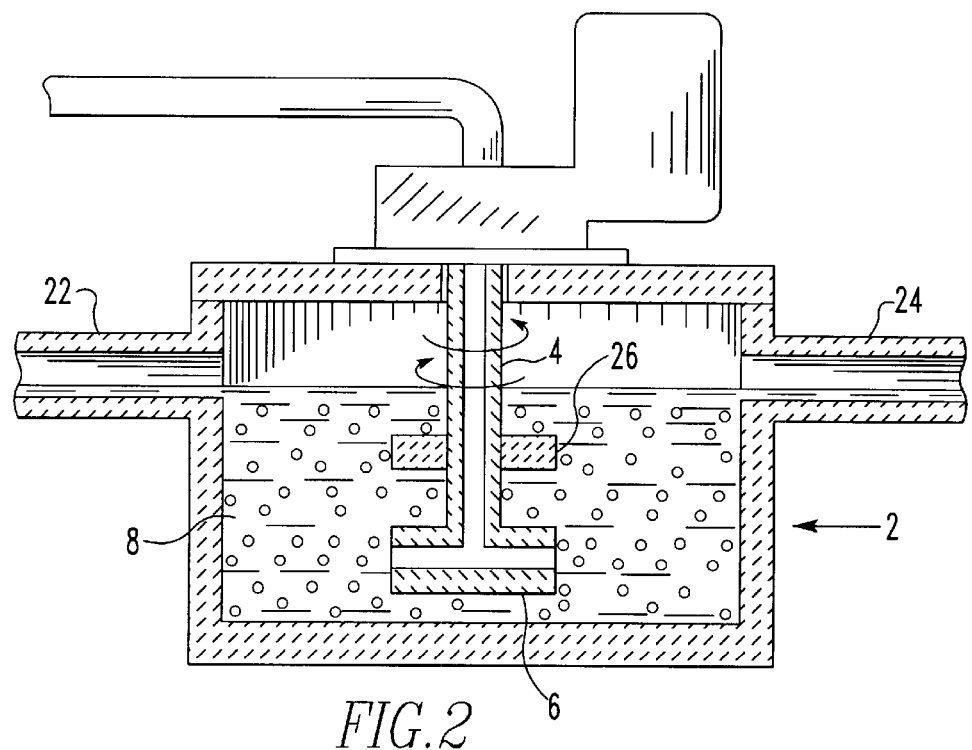
FIG. 2 is an elevational view in cross-section illustrating the invention using a double impeller.

FIG. 2 illustrates another embodiment wherein a second impeller 26 is fixed to a single impeller shaft 4. Impeller 6, fixed to the free end of shaft 4, can have a gas diffuser or nozzle or the gas can be supplied adjacent impeller 6 at a remote site in vessel 2 preferably below impeller 6. Additionally, impeller 26 may have a gas diffuser and can have the same configuration as impeller 6 or a different configuration which will aid in creating increased shear forces in molten metal when rotated in conjunction with impeller 6. Impeller 26 has the advantage of providing additional shear forces in the molten metal body when the rotation of the impeller is reversed. Thus, fluxing material is dispersed throughout the molten body with a higher level of intensity for a more efficient fluxing process. The times used for reversing can be similar to that used for the single impeller.

Figure 3:
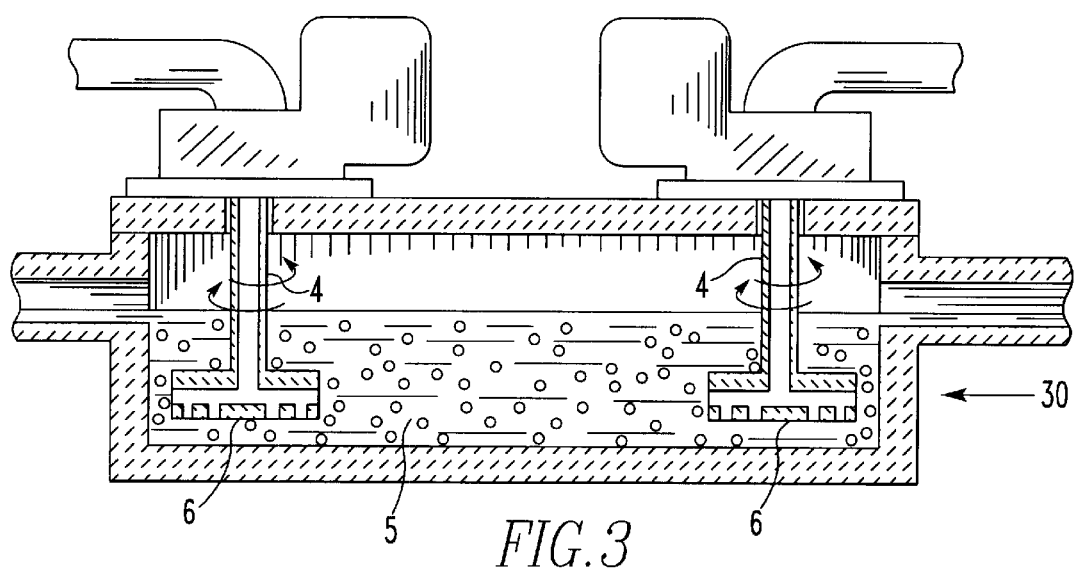
FIG. 3 is another cross-sectional view of twin impellers operating in accordance with the invention.

With reference to FIG. 3, there is shown another embodiment of the present invention including a containment vessel 30 having shafts 4 and impellers 6 containing molten aluminum 5. Shafts 4 and impellers 6 can be set to rotate in the same direction or opposite direction during the same time period. Thereafter, the rotation of each impeller is reversed periodically, usually in synchronization with the other impeller to provide for a high level of shear forces for dispersing of the media in the molten metal. Fluxing gas can be added in the same manner as referred to for the single impeller in FIG. 1. In this embodiment, the reversing cycle or period can be the same for each impeller or the reversing cycle can be shorter for one impeller and longer for the other and then these reversing cycles can be reversed in synchronization to obtain the most desirable combination of shear forces for dispersion. While two motors are shown driving the impellers in FIG. 3, one motor can be employed with the appropriate gears. The time periods for reversing direction of rotation can be similar to that described for FIG. 1.

Figure 4:
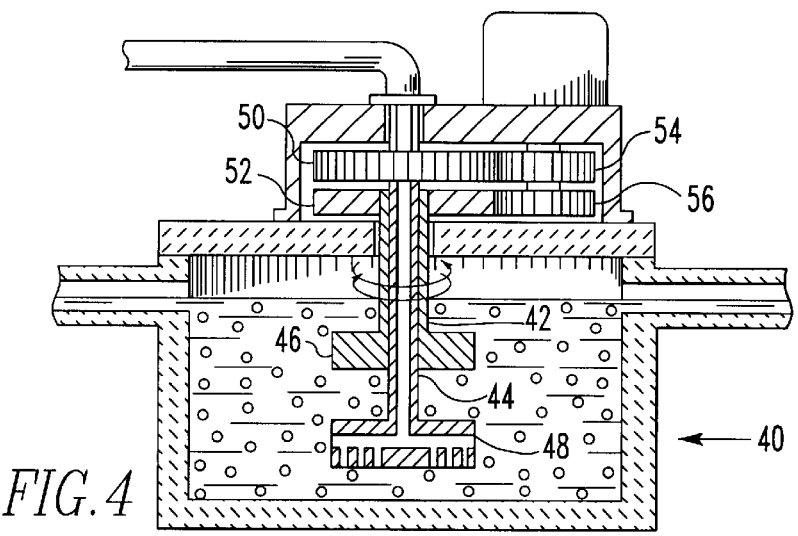
FIG. 4 shows a cross-sectional view of a further embodiment of the invention.

With respect to FIG. 4, there is shown a further embodiment of the present invention which includes a molten metal containment vessel 40 having two impellers on concentric shafts 42 and 44 which carry impellers 46 and 48. Fluxing gas may be supplied for fluxing purposes in the same way as referred to for FIG. 1. Additionally, for improved fluxing, the impellers 46 and 48 may rotate in the same direction for the same period of time. Further, impellers 46 and 48 may reverse direction at the same time for the same period. Or, impellers 46 and 48 may rotate in opposite directions for the same period, and both may reverse direction for the same period of time. Further, the rate of rotation for each impeller may be the same or one impeller may be set so as to rotate faster than the other in order to maximize shear force or the fluid velocity gradients in the molten metal. In the embodiment shown in FIG. 4, a single motor, which can be electric or air driven, is shown driving shafts 42 and 44 in the same direction of rotation through gears 50, 52, 54 and 56. In addition, the period or reversing cycle may be longer for one impeller than for the other impeller. Thus, it will be seen that various combinations of rates of rotation, direction of rotation, and periods of rotation may be utilized, all of which are intended to be encompassed within the scope of the invention because the specific details set forth are by way of illustration and not of limitation.

Figure 5:
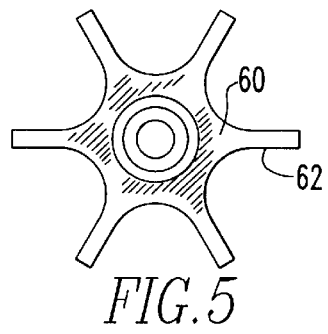
FIG. 5 is a top view of an impeller useful in the invention.
Figure 6:
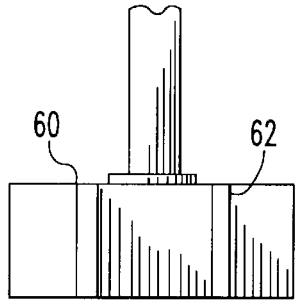
FIG. 6 is an elevational view of an impeller useful in the invention.
Figure 7:
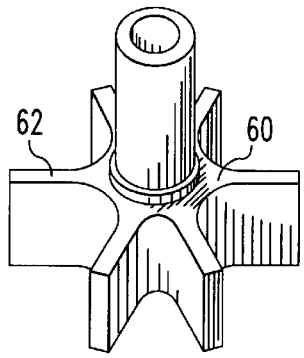
FIG. 7 is a perspective view of the impeller useful in the invention.

The impeller or disperser used in the present invention is any impeller or disperser which may be useful in creating shear forces in the melt for homogenization of the melt or for dispersing materials throughout the melt in accordance with the invention. Thus, the impeller may have canted vanes, and combinations of vanes may be used when two or more impellers are used. A suitable impeller 60, shown in FIGS. 5, 6 and 7, has vanes 62 substantially vertical to the plane of rotation. Such impeller is disclosed in U.S. Pat. No. 5,160,693 incorporated herein by reference.

The shaft and impeller may be made from graphite, silicon carbide or ceramic or such material which is compatible with molten metal such as molten aluminum.

The impellers of the present invention can rotate at an rpm in the range of 15 to 750 or combinations of such revolutions. The rate of rotation need not be constant. For example, the rate of rotation can be less at the beginning of the reversing period and can be higher at the end of the reversing period for purposes of inducing more constant shear stresses in to the melt.

Figure 8:
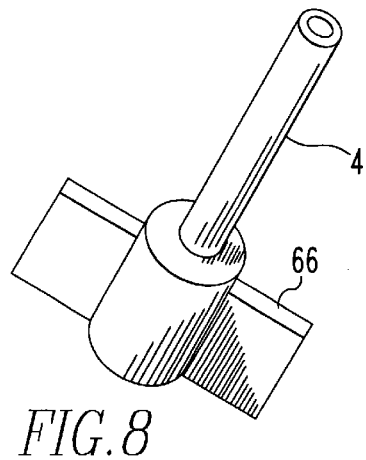
FIGS. 8 and 9 are embodiments illustrating impellers or paddles which may be used in accordance with the invention.
Figure 9:
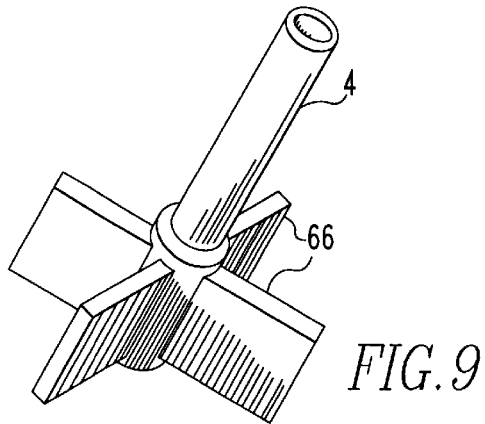

In addition, the impeller can have a flat paddle configuration as shown in FIG. 8 where shaft 4 terminates in flat plate 66. Fluxing gas may be added either remotely or through shaft 4 as disclosed earlier. Further, several flat plates 66 may be disposed along shaft 4 or shaft 4 may constitute a continuous plate at least to the extent that it is emerged in the melt. Plates 66 may be arranged as shown in FIG. 9, example, or any combination of plates may be used and such are intended to be encompassed within the scope of the invention. The plates or paddles generate very high shear forces in the melt in accordance with the invention and accordingly are very useful in the invention.

Figure 10:
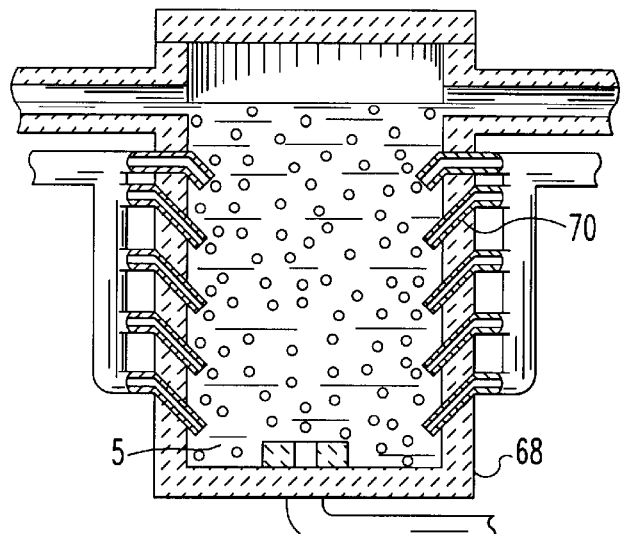
FIG. 10 is a cross section of a molten metal vessel employing tuyeres in the invention.
Figure 11:
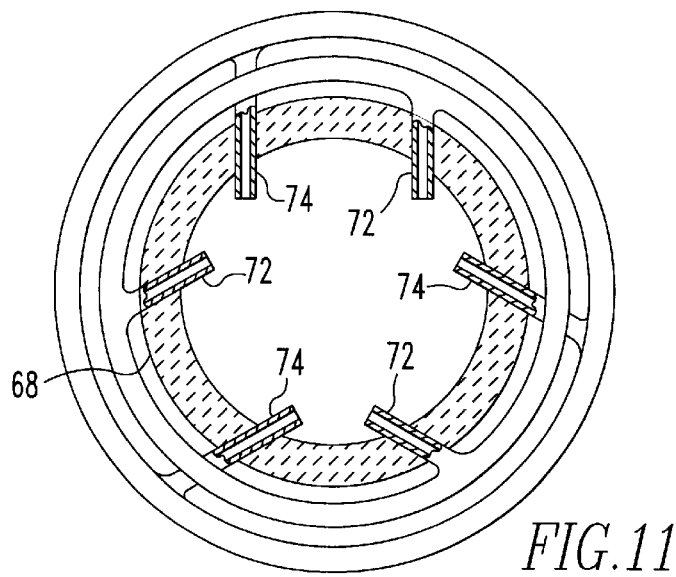
FIG. 11 is a cross section of the vessel of FIG. 10.

While generation of shear forces in melts such as molten metal having been demonstrated herein using impellers other mixing means or means for generating shear forces are contemplated. For example, shear forces may be generated by means of tuyeres 70, FIG. 10, in container 68 containing molten metal 5. In the configuration in FIG. 10, tuyeres 70 can be spaced apart up the side of container 68. One set of tuyeres 72 are arranged so as to direct gas or liquid such as molten salts therefrom in a clockwise direction and another set of tuyeres 74 can be positioned to direct gas or liquid therefrom in a counter current direction. One set of tuyeres are directed so as to move the melt in one direction and thereafter the second set of tuyeres are operated against the direction of the melt to generate shear forces therein to improve dispersion of fluxing material in the melt by reversing direction of melt flow.

In another embodiment the melt may be stirred in one direction by an electromagnet stirrer preferably in a circular direction. Afterwards, the electromagnet stirrer can be reversed periodically by reversing the electromagnetic field to generate shear forces in the melt and to promote intimate mixing or dispersing of media in the melt.

Figure 12:
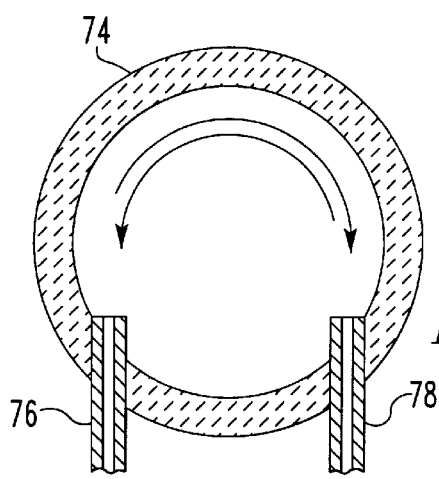
FIG. 12 is a top view of a molten metal vessel illustrating the use of molten metal conduits in the invention.

In FIG. 12, molten metal may be introduced to vessel 74 along conduit 76 to induce circular movement to the melt contained therein. Thereafter, the flow of molten metal along conduit 76 can be stopped and molten metal introduced through conduit 78 to generate shear forces in accordance with the invention. The flow of molten metal into vessel 74 can be alternated between conduits 76 and 78 to maintain a predetermined level of shear forces in the melt. It will be appreciated that combinations of these methods for generating shear forces are contemplated within the purview of the invention.

To facilitate fluxing efficiently, means is provided to interrupt gas flow to the body of molten metal at the time of rotation direction change of the impeller. This may be accomplished by use of a solenoid. In the preferred embodiment, and electric motor may be used to drove the impeller gearbox If a DC motor (direct current) is employed, the direction of rotation can be accomplished by reversing the direction of the applied current. Current reversal is facilitated by a set of timers to control the duration of rotation in either direction. This may be coupled to a double throw relay. An important element of the current reversing circuit is a means for ramping the applied current at a rate that does not mechanically shock the system immediately upon reversal. Also required is a mechanical device capable of bidirectional rotation that attaches the impeller to the drive shaft and the drive shaft to a gearbox. The preferred method of operating and reversing direction of rotation is set forth in U.S. Pat. No. 5,462,580 incorporated herein by reference.

The process in accordance with the invention has the advantage that it requires less processing time. Thus, there is considerable savings in the energy requirement to maintain the body of molten metal at temperature to perform the fluxing operation. Further, the process and system has the advantage that the equipment used for performing the fluxing can be downsized resulting in further savings. Because the subject system is more efficient in dispersing gas, considerably less gas is needed for the fluxing operation. In addition, because the present system is essentially vortex free when compared to conventional systems, less skim is generated and further only minimal skim is ingested into the melt. Thus, a protective layer of skim or salt or other material can be maintained on the surface of the body with substantially no ingestion. The system is generally more efficient in removing both dissolved and suspended impurities.

While mixing in accordance with the invention has been described with respect to fluxing bodies of molten metal, its use is not necessarily limited to fluxing. That is, the present invention has application to any body containing molten material or a molten phase which is to be mixed with another phase such as another liquid or a solid phase such as dispersing molten or solid salts in molten aluminum. Thus, the invention may be used for mixing a fluid body comprised of two or more phases. For example, the invention may be used for dispersing solid particles in molten metal such as silicon carbide particles in molten aluminum, e.g., mixing metals and non-metals. Further, the invention may be used for mixing two-phase aluminum systems such as molten aluminum and solid aluminum systems, for example, when molten aluminum is used to dissolve solid aluminum scrap. By media as used herein is meant to include gas, molten salts or solid salts and metals.

It should be understood that the shear forces and dispersion of media in the molten metal can be accomplished by a phase contactor or agitator provided in the body of molten metal. By disperser as used herein is meant to include any kind of phase contactor or agitator, including a propeller, impeller, nozzles, rotating plates, counterflow of molten metal and the like. Also, it will be understood that the shear forces and dispersion may be created by a rotating molten metal container or insert whose direction of rotation is reversed periodically in accordance with the teachings of this invention. Further, the shear forces and dispersion of media or mixing may be accomplished by rotating a molten metal container in one direction and rotating the phase contactor, e.g., impeller, in the opposite direction. The molten metal container may be mounted on a turntable for uni-directional rotation while the impeller is mounted to rotate uni-directionally opposite to the molten metal container.

Figure 13:
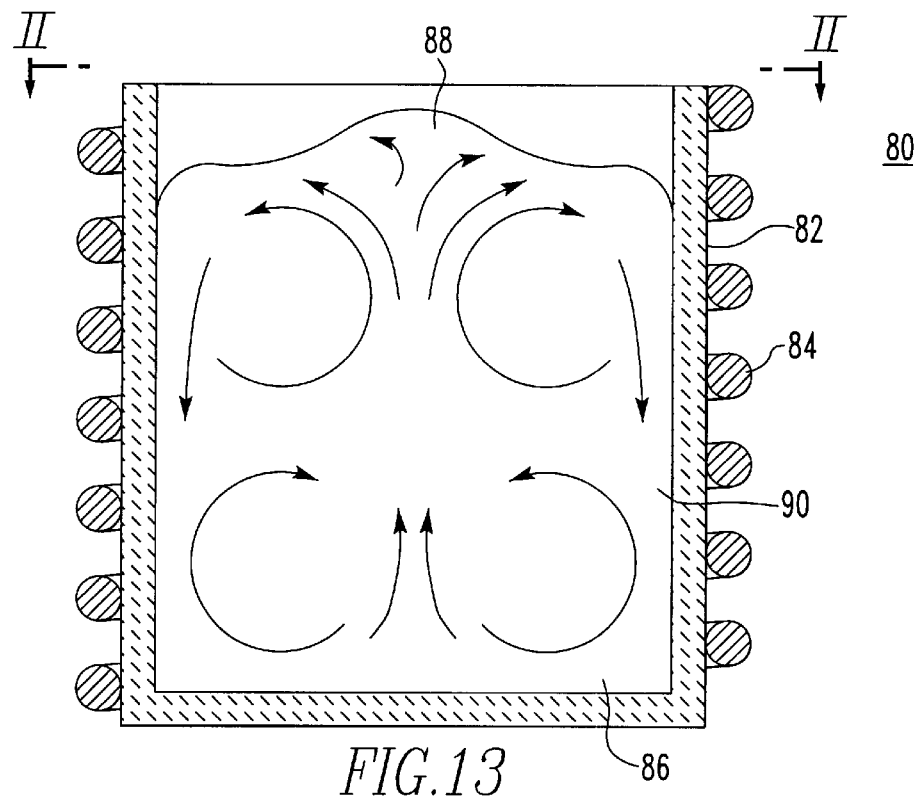
FIG. 13 is a cross section of an induction furnace showing molten metal flow direction.

Another embodiment of the invention employs a combination of induction furnace and a uni-directional disperser or impeller. One type of molten metal flow is illustrated in FIG. 13 which depicts an induction furnace 80 comprising a container 82 and induction coils 84. Molten metal 86 subjected to induction has a flow pattern where molten metal rises on the center portion or inner region 88. The molten metal then flows generally outwardly and downwardly at outer regions 90. The induction heater can operate to provide heat as well as a stirring action. It should be understood that other types of molten metal flow patterns can be obtained depending on the electric induction furnace, and such flow patterns are intended to be encompassed within the purview of the invention.

Figure 14:
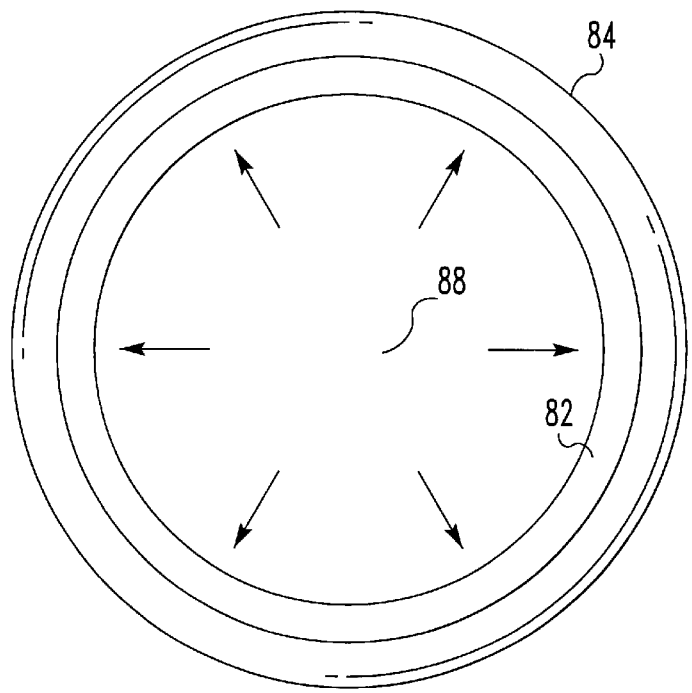
FIG. 14 is a top view along the line II—II of FIG. 13.
Figure 15:
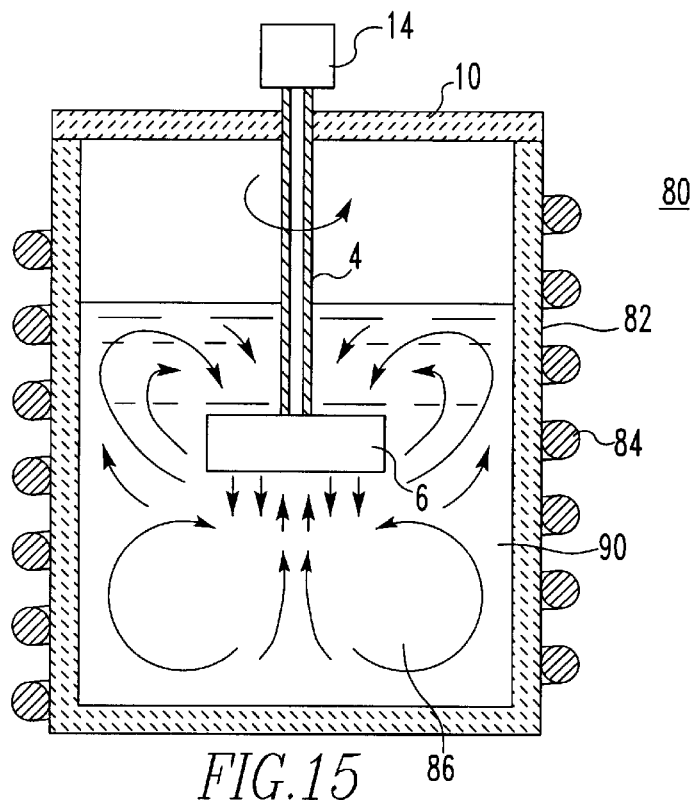
FIGS. 15 and 16 are cross-sectional views of a combination induction furnace and impeller showing molten metal flow showing different molten metal flow patterns.

The outward flow of molten metal at the top of the furnace is shown in FIG. 14. Thus, it will be seen from FIG. 13 that skim or other materials will be ingested which in a fluxing operation is very undesirable. Further, the turbulent surface results in generation of additional skim by exposure of new molten metal to air. When the induction furnace is operated simultaneously in combination with a uni-directional impeller as illustrated in FIG. 15, the surface is much less turbulent and can assume a quiescent type surface. Yet, because impeller 6 is rotated in a direction which opposes the upward flow of molten metal as illustrated in FIG. 13, very high shear forces are obtained in the molten metal. As explained earlier, the very high shear forces are beneficial in the fluxing operation.

In FIG. 15, there is shown an impeller 6 mounted on hollow shaft 4. The impeller is rotated uni-directionally to oppose the upward flow in the center of the furnace created by the induction coils. As noted, the opposing force created by the impeller results in very high levels of shear forces. This improves fluxing by dispersion of the fluxing gas in very small bubbles. Other fluxing material such as salts are equally well dispersed.

While the molten metal is shown flowing upwardly in the center of the furnace, it should be noted that other flow patterns may be obtained. For example, the molten metal may flow downwardly in the center region of the furnace and the impeller rotated in a direction to oppose the downward flow.

Further, while FIG. 15 shows only one impeller, it will be understood that two or more impellers mounted on the same shaft may be used with increased efficiency. In addition, while fluxing gas is shown being introduced down a hollow shaft, the fluxing gas may be introduced by any means, as explained earlier.

Figure 16:
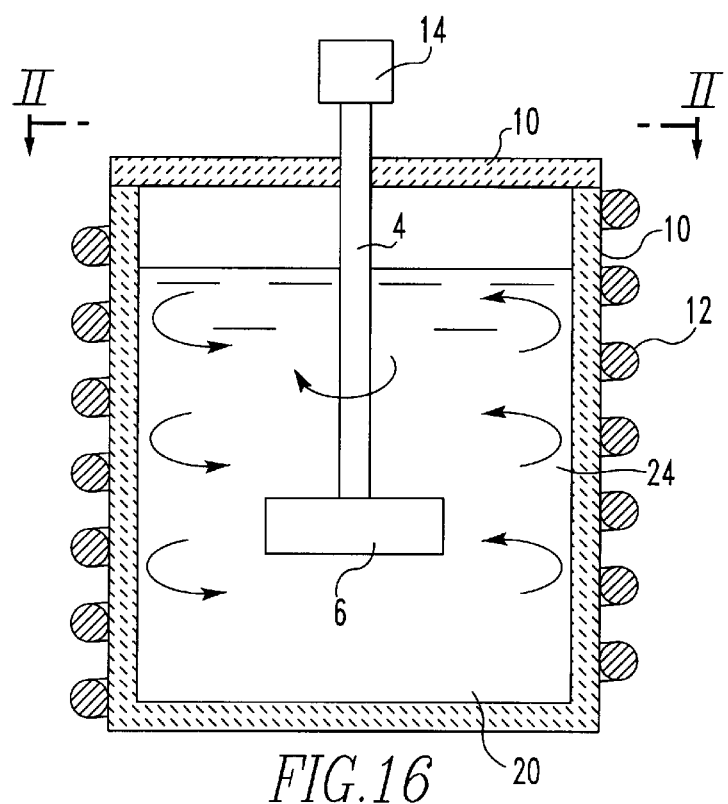

In FIG. 16, there is illustrated another embodiment of the invention utilizing induction coils and an impeller rotating uni-directionally. That is, induction coils 12 can be operated to circulate molten metal about or around shaft 4. When induction coils are operated to circulate molten metal in this manner, a vortex is formed and skim can be ingested. In the process of the invention, impeller 6 is rotated in a direction opposite to the circulating of the molten metal by the induction coils. This provides for high shear forces in the molten metal and fine bubbles maximizing the fluxing operation. Fluxing material may be introduced as disclosed earlier.

With respect to the impeller, any type impeller can be used which is efficient in introducing fluxing gas or which produces high shear forces in countering the flow of molten metal produced by the induction coils.

Figure 18:
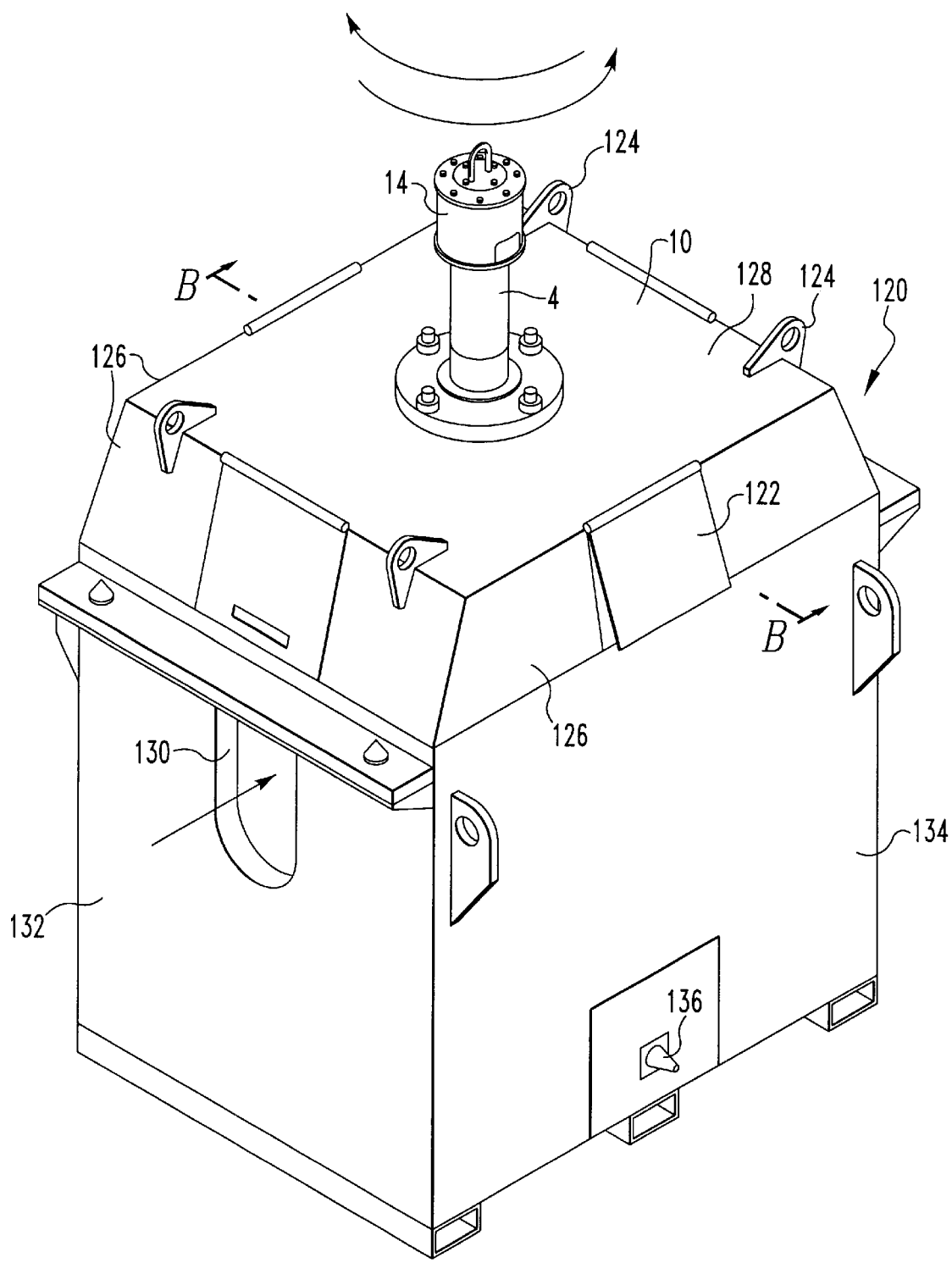
FIG. 18 is a perspective view of a treatment box or bay in accordance with the invention.
Figure 19:
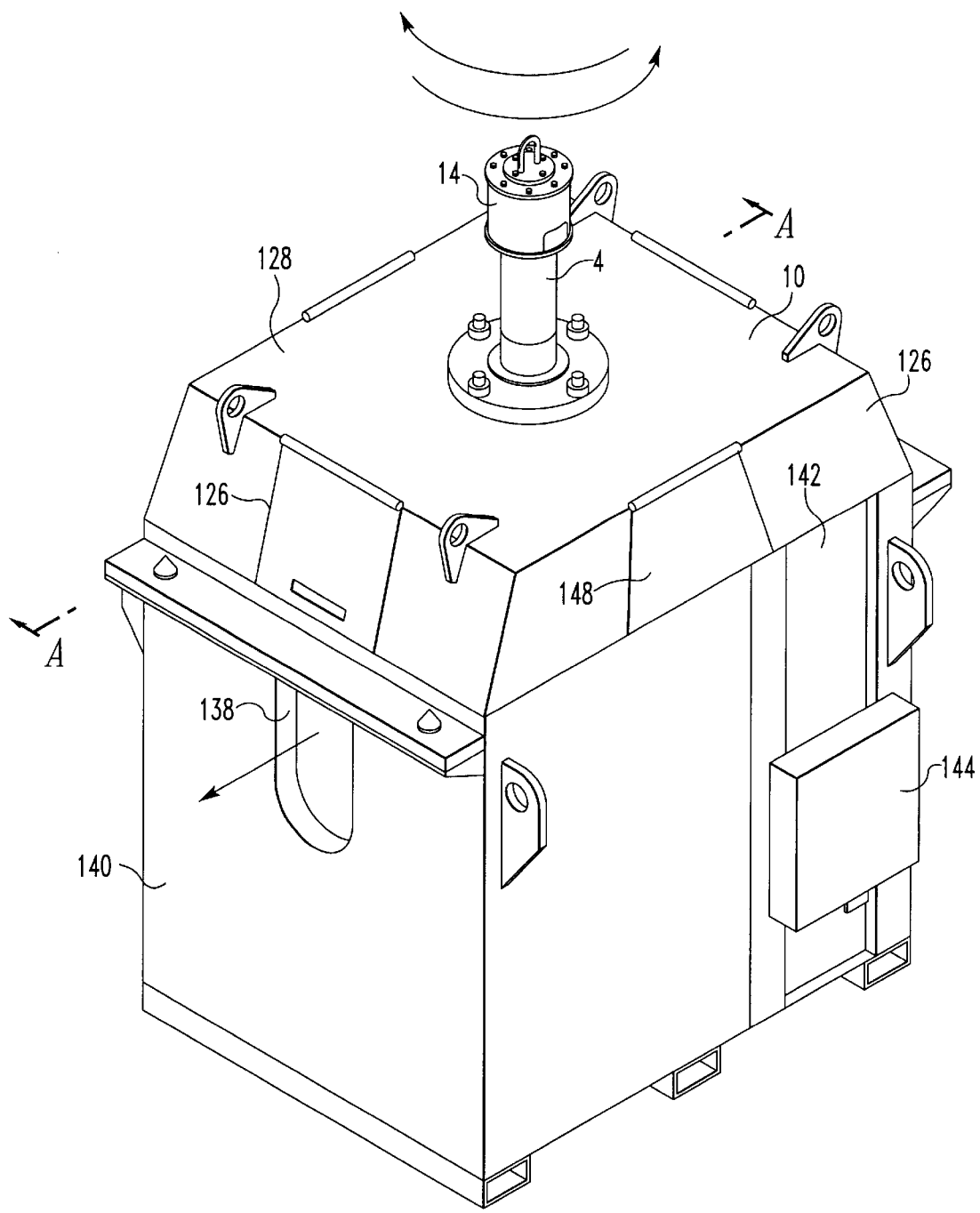
FIG. 19 is another view of the treatment box or bay.

Referring now to FIG. 18 there is shown a container for treating molten metal to remove solids or gases therefrom in accordance with the invention. In FIG. 18, drive mechanism 14 and shaft 4 are shown supported by structure or removable lid 10. Also, there is shown a box-shaped structure 120 which supports lid 10. Lid 10 can have several doors such as door 122 for removing skim or dross. Also, lid 10 is shown having lifting ears 124 which permit lifting of the lid to provide access to the inside of box 120. Lid 10 is shown having truncated sides 126 and flat top portion 128 having fasteners thereon to securely mount drive system 14 shown more clearly, for example, in FIG. 20. Box 120 is shown with a molten metal entrance 130 on side 132 for introducing molten metal to box 120 for treatment. On side 134 is shown a drain plug 136 for draining molten metal from box 120. In FIG. 19 there is shown exit 138 on side 140 for removing treated molten metal. Also shown in FIG. 19 on side 142 is a box 144 for containing electrical controls for electric heaters 146 shown, for example, in FIGS. 20 and 21. Door 148 is provided on lid 10 to provide access to electrical heaters 146.

Figure 20:
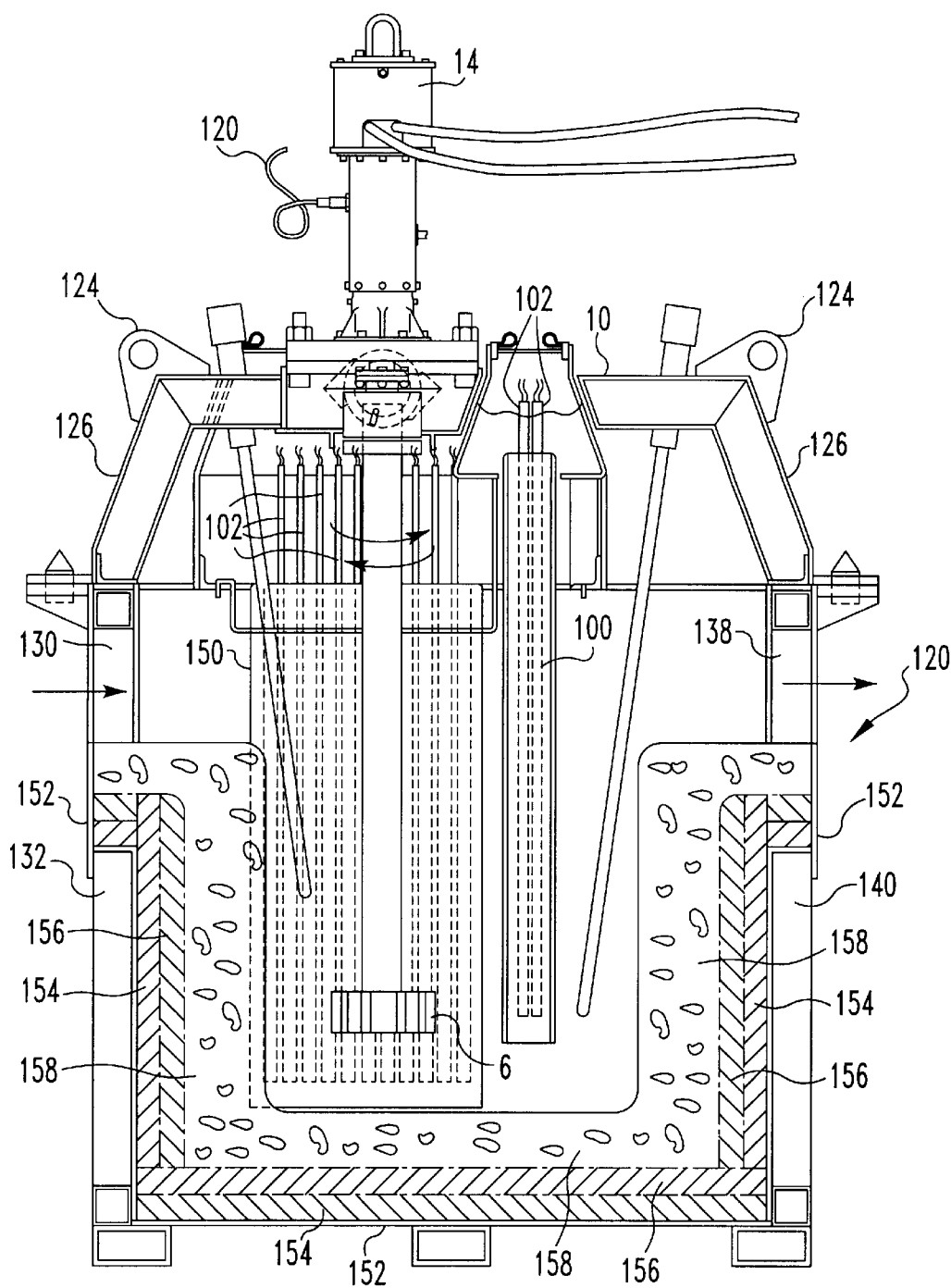
FIG. 20 is a cross-sectional view along the line A—A of FIG. 19.

FIG. 20 is a cross-sectional view through the line A—A of FIG. 19 showing baffle heater 100, shaft 4 and impeller 6. In baffle heater 100 are shown heaters 102. Also, in FIG. 20 side heater 150 showing electrical heaters 102 which provide for additional heat to be provided to molten metal passing through treatment container 120. It should be noted that lid 10 can be removed from container 120 withdrawing the impeller without disturbing baffle heater 100.

Drive mechanism 14 illustrated in FIG. 20 is a hydraulic drive system as described in U.S. Pat. No. 5,462,580, incorporated herein by reference.

Container 120 is comprised of a steel shell 152. For purposes of insulation and containing molten metal, several liners are used. Thus, a first liner 154 is provided comprised of marinite or bubble alumina which has high thermal insulation values. A second liner 156 is provided as a back-up liner to contain the molten metal. Typically, liner 156 is comprised of a castable refractory such as alumina-silica phosphate bonded refractory. Third liner 158 is comprised preferably of fused silica having non-wetting agents and is available from Wahl Refractories under the designation FS-AL. These refractories are particularly suited to containing molten aluminum.

Figure 21:
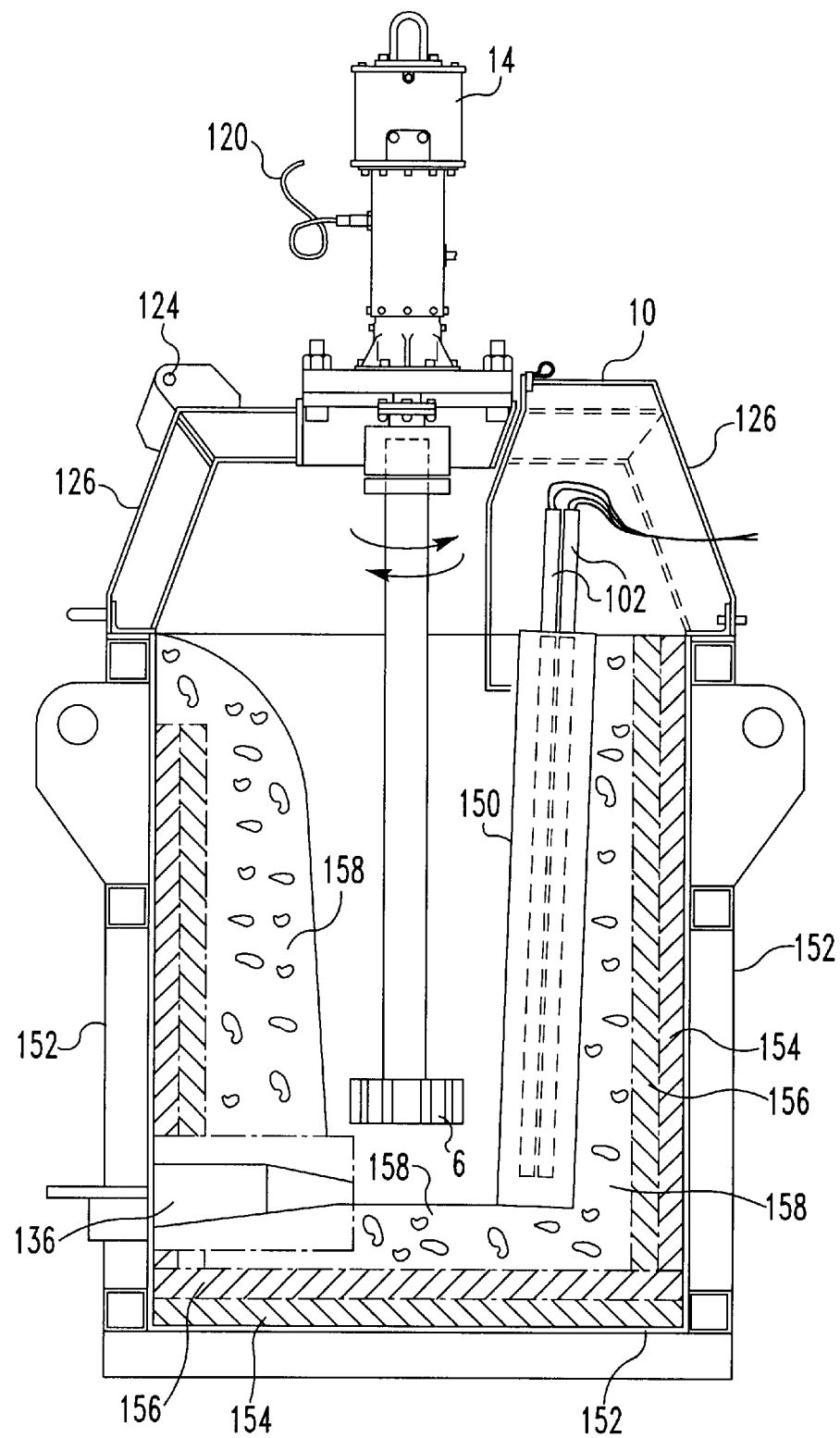
FIG. 21 is a cross-sectional view along the line B—B of FIG. 18.

FIG. 21 is a cross-sectional view along the line B—B in FIG. 18 showing tap hole 136 and a cross section through side heater 150.

It will be appreciated that a filter can be incorporated in container or box 120 and can be placed inside or outside exit 138 to capture particles that are present in the melt. Preferably, the filter is placed or located outside container 120 for ease of access. The filter can be any filter which is suited to filtering molten metal such as molten aluminum.

For example, ceramic foam filters can be used. Preferably, filters used in accordance with the invention are comprised of loose media contained within a suitable containment means. The loose media has the advantage that it can be comprised of different particle sizes for filtration efficiency without the difficulties of bonding. A loose media filter can use depth mode filtration. Further, loose media filters have the advantage of cost reduction by avoiding fabrication costs, for example, in bonding. Loose media filters can be comprised of tabular alumina, silicon carbide, mullite, and crush carbon. The particle size of the loose media filter preferably ranges from about 4 mm down to about 0.5 mm with particle sizes extending beyond these sizes being useful. In one aspect of the invention, loose media filter may be contained in a ceramic fiber bag or container substantially inert to the molten metal. The ceramic fiber bag can be comprised of Nextel 312 or 440 cloth. Alternatively, the loose media can be contained in a ceramic foam filter box.

In another aspect of the filtration mode, a coating such as borosilicate or low temperature softening point material, such as a glass-based material, can be applied to the filtration media whether loose media or bonded media is used to aid in capture of particles in the melt. Preferred softening points are in the range of 100° to 1400° F. when molten aluminum is being filtered. Bonded media can comprise particles of alumina, silicon carbide, mullite, or silicon nitride bonded with phosphate, calcium aluminate, or other vitreous binder. The coating is comprised of a material having adhesive or sticky properties at molten metal temperatures to provide physiochemical bonding. Thus, when particles in the melt contact the coating on the filter, they become attached to the sticky coating. This prevents the particles in the filter becoming dislodged and subsequently contaminating the melt.

EXAMPLE

For purposes of demonstrating the effectiveness of reverse rotation for purposes of fluxing molten aluminum on a continuous basis, a chamber containing molten aluminum was used and an impeller having an 8 inch diameter was immersed in the molten aluminum to a depth of 25 inches. The chamber had a circular cross-section. The impeller was rotated at a speed of 425 RPM and the direction of rotation was reversed every 24 seconds. Molten aluminum was flowed through the chamber at a rate of 61,000 lbs/hour and the metal residence time in the chamber was 97 seconds. For purposes of hydrogen removal, argon gas was introduced through the impeller at a rate of 150 SCF/hour. Hydrogen concentration is given in $cm^3 H_2(STP)/100$ g Al and determined by Ransley solid extraction method. Aluminum alloys AA6111 and AA3004 were tested. The results are as follows:

TABLE I

| Alloy Sample | Upstream $H_2$ Concentration | Downstream $H_2$ Concentration | % Reduction |
| --- | --- | --- | --- |
| 6111-1 | 0.23 | 0.09 | 61% |
| 6111-2 | 0.24 | 0.09 | 63% |
| 6111-3 | 0.26 | 0.09 | 65% |
| 3004-1 | 0.17 | 0.06 | 65% |
| 3004-2 | 0.19 | 0.04 | 79% |
| 3004-3 | 0.18 | 0.06 | 67% |

For purposes of testing alkali removal from AA5052 a fluxing gas of argon and chlorine was used where argon was flowed to the melt at a rate of 150 SCF/hour and chlorine, at 7.5 SCF/hour. The other conditions were as noted above. Trace element concentration in wt. % was determined by optical emissions spectroscopy. The results were as follows:

TABLE II

| Element | Upstream Concentration | Downstream Concentration | Stoichiometric Chlorine required |
| --- | --- | --- | --- |
| Sodium | 0.0008 w/o | 0.0002 w/o | 2.9 scfh |
| Calcium | 0.0012 w/o | 0.0007 w/o | 2.8 scfh |
| Lithium | 0.0003 w/o | 0.0002 w/o | 1.6 scfh |
| Total Stoichiometric Chlorine Requirement | | | 7.3 scfh |
| Actual Chlorine Used | | | 7.5 scfh |
| Overall Percent Stoichiometric Reduction | | | 97% |

It will be noted that $H_2$ was reduced by over 60% in all tests and that the overall percent stoichiometric reduction of Na, Ca and Li was 97%.

While the invention has been described in terms of preferred embodiments, the claims appended hereto are intended to encompass other embodiments which fall within the spirit of the invention.

What is claimed is:

1. A method for filtering molten aluminum containing suspended particles using an improved filtration media, the method comprising the steps of:
    (a) providing a source of molten aluminum;
    (b) providing filtration media having a coating thereon, the coating having a softening point at molten aluminum temperatures to provide adhesive properties and bonding of suspended particles in the molten aluminum thereto; and
    (c) contacting said filtration media with molten aluminum and adhesively bonding suspended particles thereto to provide molten aluminum having suspended particles removed therefrom.

2. The method in accordance with claim 1 wherein said media is selected from the group consisting of loose media or bonded media.

3. The method in accordance with claim 2 wherein said loose media comprised of particles selected from the group consisting of tabular alumina, silicon carbide, mullite and crushed carbon.

4. The method in accordance with claim 2 wherein said loose media has a particle size in the range of 0.5 to 4 mm.

5. The method in accordance with claim 2 wherein said bonded media is comprised of a material selected from the group consisting of alumina, silicon carbide, mullite and silicon carbide.

6. The method in accordance with claim 1 wherein said coating has a softening point below 1400° F. and exhibits a sticky surface to which attaches suspended particles.

7. The method in accordance with claim 1 wherein said media is a foam filter media.

8. The method in accordance with claim 1 wherein said coating is a glass-based material having a softening point in the range of 100° to 1400° F. and exhibits a sticky surface to which attaches suspended particles.

9. The method in accordance with claim 1 wherein said coating is a borosilicate coating material having a softening point in the range of 100° to 1400° F. and exhibits a sticky surface to which attaches suspended particles.

10. An improved media for filtering molten aluminum containing suspended particles, the improved media comprised of:
    (a) a media base; and
    (b) a coating provided on said media base, the coating having a softening point at molten aluminum temperatures providing adhesive properties to said coating at molten aluminum temperature, the coating capable of bonding said suspended particles thereto to capture said suspended particles from the molten aluminum.

11. The improved media in accordance with claim 10 wherein said media base is selected from the group consisting of loose media or bonded media.

12. The improved media in accordance with claim 11 wherein said media is selected from the group consisting of tabular alumina, silicon carbide, mullite and crushed carbon.

13. The improved media in accordance with claim 11 wherein said loose media has a particle size in the range of 0.5 to 4 mm.

14. The improved media in accordance with claim 11 wherein said bonded media is comprised of a material selected from the group consisting of alumina, silicon carbide, mullite and silicon carbide.

15. The improved media in accordance with claim 10 wherein said coating has a softening point in the temperature range of 100° to 1400° F.

16. The improved media in accordance with claim 10 wherein said coating has a softening point below 1400° F.

17. The improved media in accordance with claim 10 wherein said media base is a foam.

18. The improved media in accordance with claim 10 wherein said coating is comprised of a glass-based material having a softening point below molten aluminum temperatures and having adhesive properties capable of bonding suspended particles thereto to capture said suspended particles from said molten aluminum.

19. The improved media in accordance with claim 10 wherein said coating is comprised of borosilicate.

* * * * *